Jan. 25, 1944. W. L. ZINK ET AL 2,339,830
TRACTOR PLOW
Filed Oct. 25, 1939 5 Sheets-Sheet 5
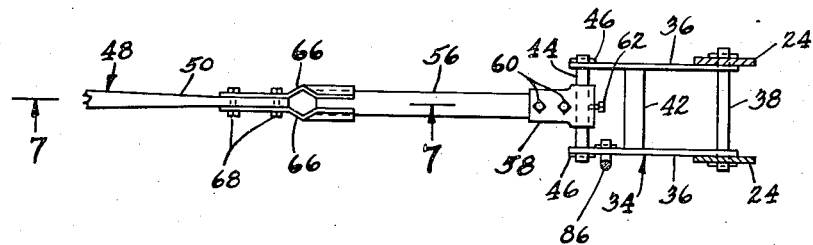
Fig. 6.
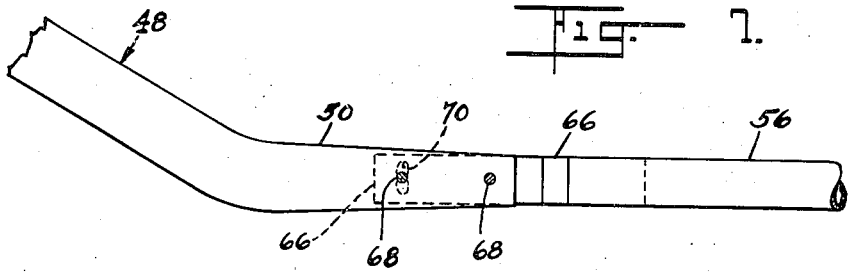
Fig. 7.
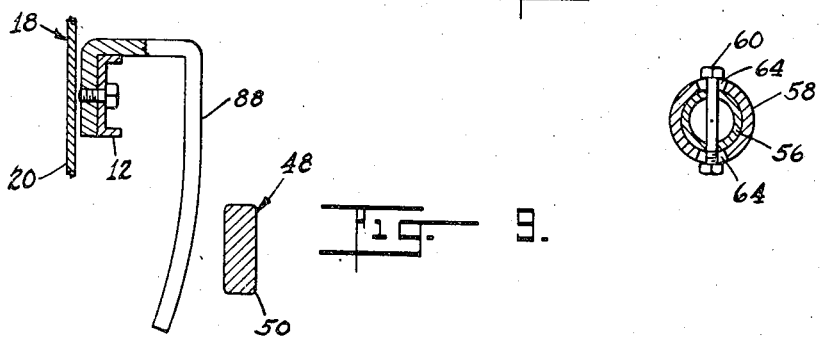
Fig. 8.
Fig. 9.
William L. Zink
Byron T. Aasland
INVENTORS
BY *Eric B. Prime*
ATTORNEY.

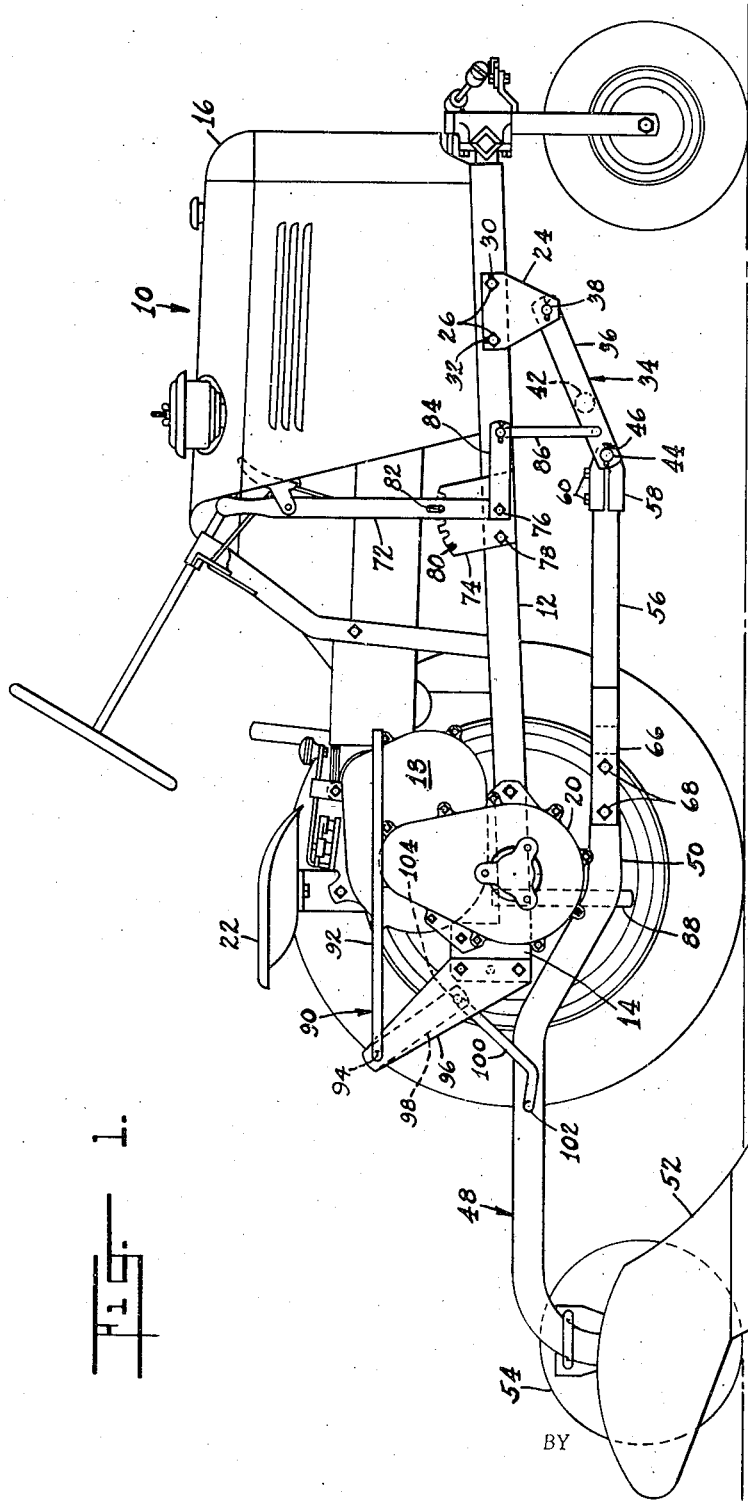

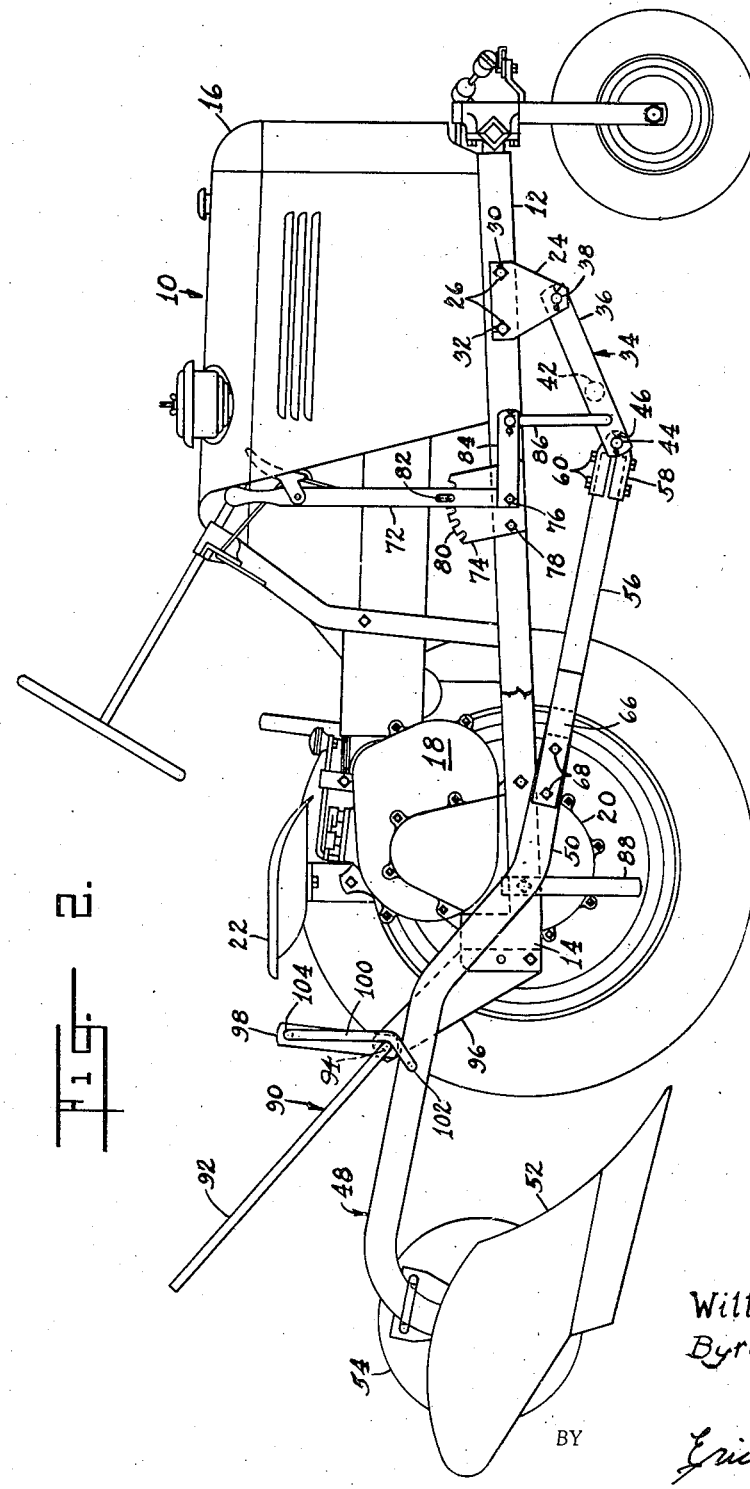

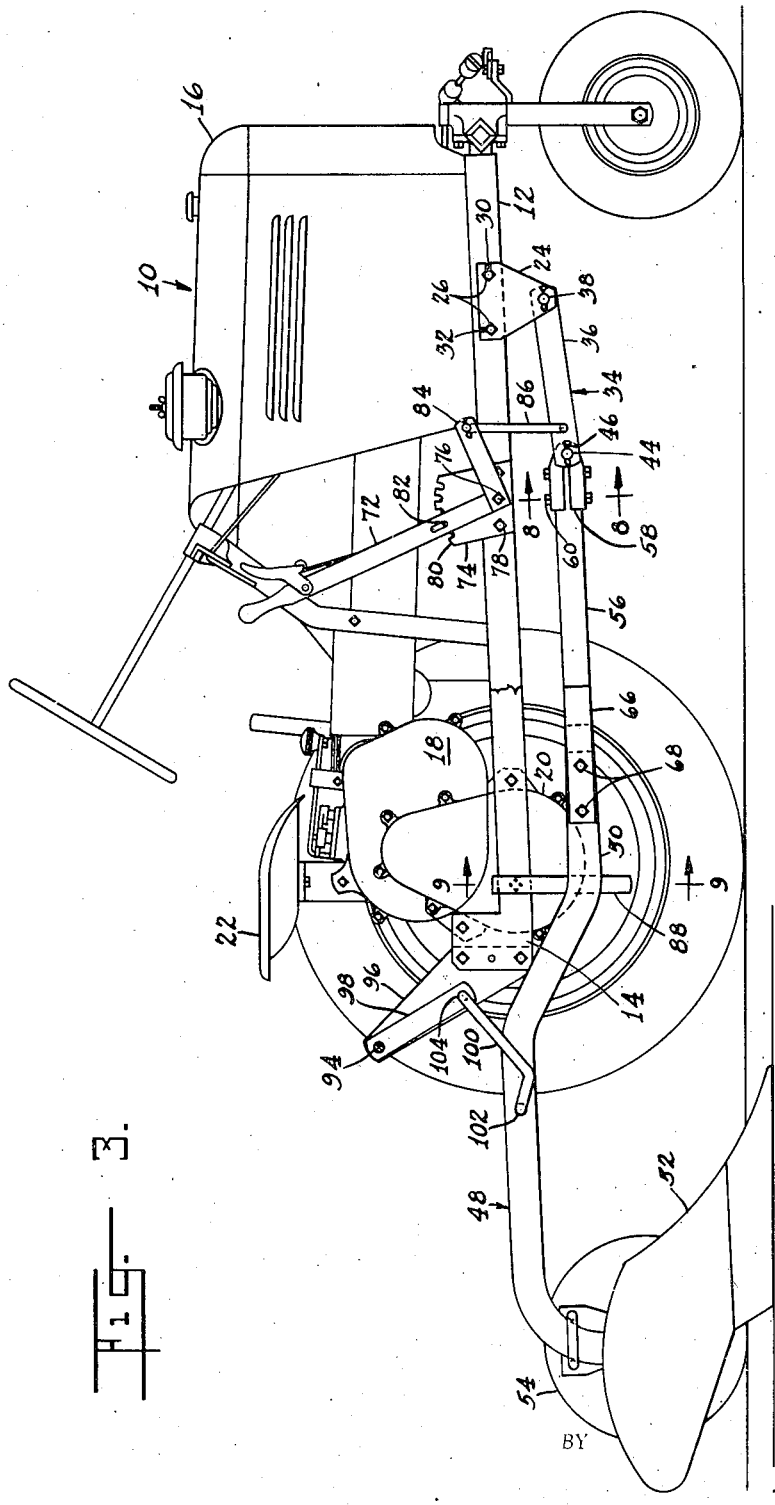

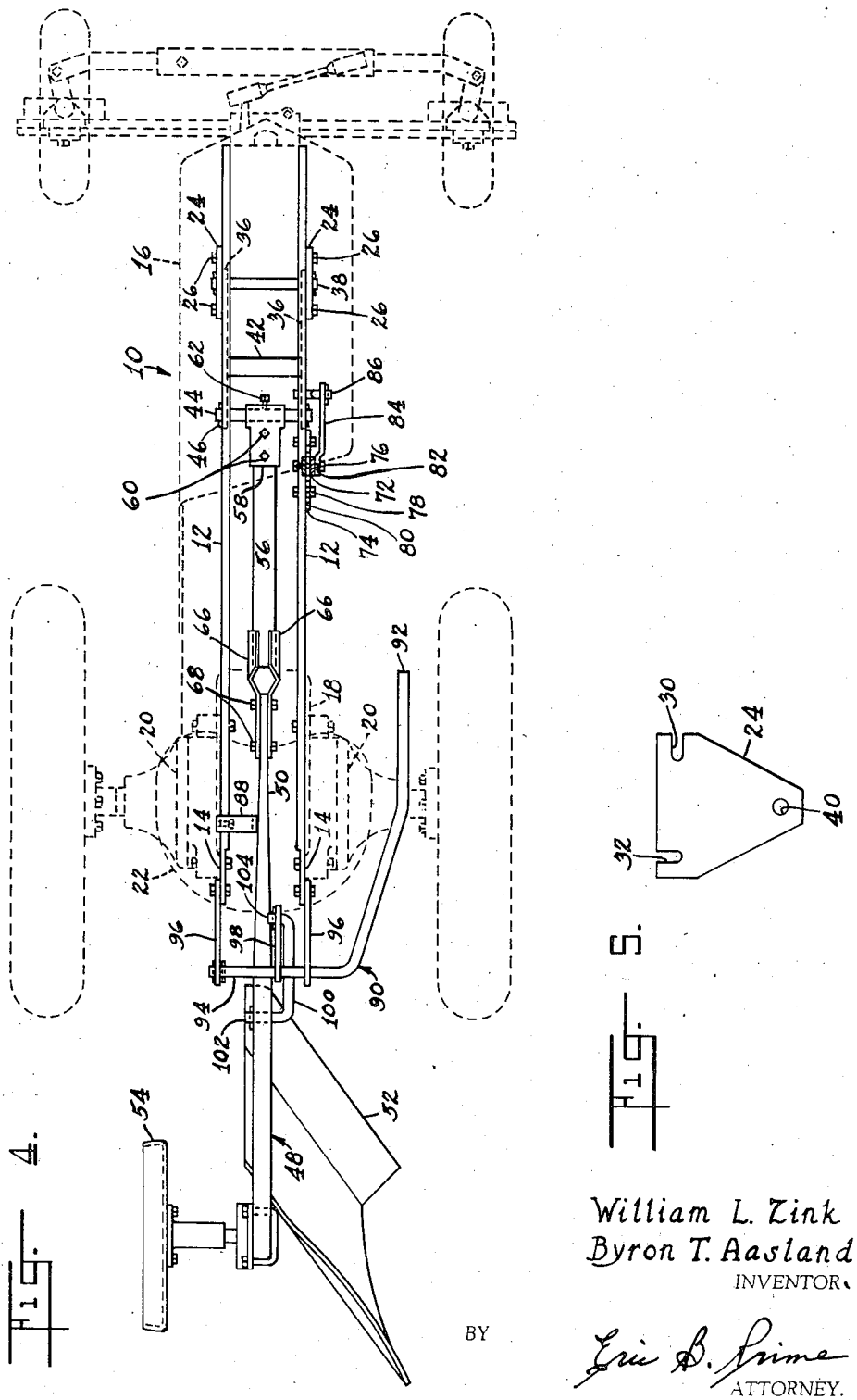

Patented Jan. 25, 1944

2,339,830

UNITED STATES PATENT OFFICE 2,339,830

TRACTOR PLOW

William L. Zink, Plano, and Byron T. Aasland, Kankakee, Ill., assignors to Sears, Roebuck and Co., Chicago, Ill., a corporation of New York Application October 25, 1939, Serial No. 301,115

3 Claims. (Cl. 97—47)

This invention relates generally to agricultural implements adapted for being drawn by automotive power such as a tractor and more particularly to an improved and novel tractor plow adapted for being drawn and transported by a tractor.

One of the primary objects of the present invention is to provide an improved and novel plow structure for being readily attached to or detached from a tractor.

A further object of the invention is to provide a plow having an improved and novel structure for attaching the plow to the tractor.

Another of the principal objects of this invention is the provision of a tractor plow having an improved and novel structure whereby the plowshare may be readily adjusted laterally and for depth of cut.

A further object of the present invention is to provide a tractor plow having an improved and novel structure for lifting and retaining the plowshare out of engagement with the ground.

Other objects and advantages of the invention will be apparent from the following description, reference being had therein to the accompanying drawings illustrating a preferred embodiment of the invention, in which:

Figure 1 is a side elevation of a tractor and plow connected together, a rear wheel of the tractor being removed, and the plow being shown in a plowing position;

Figure 2 is a side elevation similar to Figure 1, showing the plow in a lifted position out of engagement with the ground for being transported by the tractor;

Figure 3 is a side elevation similar to Figure 1 showing the plow in an adjusted position;

Figure 4 is a top plan view of the plow structure shown in Figure 1, the tractor structure with the exception of the frame being shown in dotted lines;

Figure 5 is an elevational detail view of a plate member for connecting the plow structure to the tractor;

Figure 6 is a plan view, partly in section, of a portion of the plow structure partially concealed in Figure 4;

Figure 7 is an enlarged detail sectional view taken substantially along the line 7—7 of Figure 6;

Figure 8 is a vertical sectional view taken substantially along the line 8—8 of Figure 3; and Figure 9 is a vertical sectional view taken substantially along the line 9—9 of Figure 3.

In the drawings illustrating the invention, a tractor, referred to generally by the reference character 10, is provided comprising a pair of spaced apart frame bars 12 having rear end plate portions 14 integral therewith.

A motor, not shown, is carried by the frame bars 12 at the front of the tractor and is covered by a cowling or hood 16.

A transmissin 18 is positioned at the rear of the tractor and connected to the frame bars 12, the transmission being provided with a pair of spaced apart depending housing portions 20 between which the frame bars 12 extend, and a seat 22 for the operator of the tractor is mounted on top of the transmission 18.

The tractor structure above described does not comprise a part of the present invention but is presented to illustrate a preferred type of tractor construction with which the invention is particularly adapted for use.

The plow structure to which this invention relates comprises a pair of bracket plates 24 positioned oppositely on the outer sides of the frame bars 12 and connected thereto by front and rear bolts or screws 26, the front bolts or screws 26 extending through forwardly extending slotted openings 30 in the bracket plates 24, as shown in Figure 5, and the rear bolts or screws 26 extending through upwardly extending slotted openings 32 in the bracket plates 24.

As best shown in Figures 1 and 6, a movable frame 34 comprising a pair of spaced frame members or arms 36 is hingedly connected to the bracket plates 24 by means of a pin 38 which extends through the frame members 36 and openings 40 in the bracket plates 24. The frame 34 also includes a brace bar 42 fixedly connected to the frame members 36 by any suitable means such as welding for retaining the frame members 36 in definite, spaced relationship.

A draft or hitch pin 44 extends through aligned openings in the rear ends of the frame members 36 and is retained against displacement relatively to the frame 34 by any suitable means such as cotter pins 46.

The plow structure further comprises a plow beam 48 having a lower offset front end portion 50 extending below the transmission 18 and between the frame bars 12 of the tractor. A plow body 52 is connected to the rear of the plow beam 48 for plowing the ground, and attachments, such as a gauge wheel 54, also may be connected to the beam 48 for performing the functions required.

A draft pole or beam 56, preferably tubular in shape, is provided for connecting the plow beam 48 to the frame 34, and extends into a crosshead member 58 to which it is connected by means of bolts 60, the cross-head member 58 being mounted on the draft pin 44 and adjustably positioned longitudinally of the draft pin by means of a set screw 62. As best shown in Figure 8, the crosshead member 58 is provided with slotted openings 64 for receiving the bolts 60 in order that the draft pole 56 may be adjustably positioned rotatably relatively to the crosshead member.

The draft pole 56 is further provided with a pair of rearwardly extending portions 66 fixedly connected therewith by any suitable means such as welding and disposed in spaced positions for receiving the front portion 50 of the plow beam 48 therebetween.

The plow beam 48 is connected to the rearwardly extending portions 66 of the draft pole 56 by means of front and rear bolts 68 which extend through the front portion 50 of the plow beam and the extending portions.

As shown in Figure 7, the extending portions 66 are provided with slotted openings 70 therein for receiving the rear bolt 68 in order that the plow beam 48 may be moved vertically about the front bolt 68 and adjustably positioned relatively to the draft pole 56 for varying the inclination of the plow body 52 with respect to the ground when the plow body is in the working position.

The inclination of the plow body 52 relatively to the ground may also be varied during the plowing operation by means of a manually operable lever 72 pivotally connected to one of the frame bars 12 and a rack plate 74 by means of a bolt 76, the rack plate 74 being fixedly connected to the frame bar 12 by means of bolts 78, and provided with teeth 80 positioned for engagement by a catch element 82 carried by the lever 72.

The lever 72 is provided with a transversely extending portion 84 preferably made integral therewith by welding and operatively connected to the frame 34 by a link element 86 which extends through openings in the portion 84 of the lever 72 and an arm 36 comprising a part of the hinged frame 34.

Figures 1 and 3 illustrate different plowing positions of the plow body 52 when the lever 72 is disposed in different positions. In Figure 1 the plow body 52 is illustrated as being inclined downwardly from rear to front in the working position when the lever 72 is disposed in a substantially vertical position. When the lever 72 is moved backwardly, however, from the position in Figure 1, the front end portion 50 of the plow beam 48 is lifted for decreasing the inclination of the plow body until the lever is finally disposed in the position illustrated in Figure 3, at which time the bottom of the plow will be positioned substantially parallel to the ground.

Further movement of the lever 72 backwardly from the position shown in Figure 3 will incline the bottom of the plow body 52 upwardly from rear to front, and likewise, movement of the lever 72 forwardly from the position shown in Figure 1 will increase the inclination of the plow body from the position shown in Figure 1.

Thus it will be seen that the position of the plow may be quickly and easily varied during the plowing operation until the position of the plow body is found which is most suitable to the type of plow body being used and character of the ground being plowed.

It will be noted, however, that the degree of inclination of the plow body in the working position in relation to a given position of the lever 72 is dependent on the adjusted position of the plow beam 48 relatively to the draft pole 56, adjustment being made through the bolts 68 (Figure 7).

As best shown in Figures 3 and 9, a stop or guide member 88 for limiting landside movement of the plow body 52 is connected to a frame member 12 of the tractor and extends downwardly by the side of the plow beam 48 and normally in spaced relationship therewith.

A manually operable lever 90 (Figures 1, 2 and 4) for moving the plow body 52 into and out of engagement with the ground comprises a handle portion 92 and a shaft portion 94 (Figure 4) rotatably mounted in a pair of bracket plates or members 96 which are detachably connected to the plate portions 14 of the frame bars 12.

An arm 98 is fixedly connected to the shaft portion 94 of the lever 90, such as by welding, and is operatively connected to the plow beam 48 by a link 100. The link 100 is connected to the plow beam 48 and the arm 98 by end portions 102 and 104 which extend through openings in the plow beam and the arm, respectively.

When the plow body 52 is in the working position shown in Figure 1, the lever 90, together with the arm 98 and the link 100, are in the general positions shown in Figure 1, and are free to move or float in order not to interfere or affect the operation of the plow in working the ground.

When the plow body 52 is to be transported from one location to another without working the ground, the lever 90 is moved from the position shown in Figure 1 to the position illustrated in Figure 2, for lifting and retaining the plow body 52 out of engagement with the ground.

It will be noted that when the plow body 52 is positioned out of engagement with the ground, as illustrated in Figure 2, the link 100 engages the shaft portion 94 of the lever 90 for limiting the lifting movement of the lever, and that the link 100 is bent for receiving the portion 94 of the lever so that a plane through the axes of the portions 102 and 104 of the link will lie rearwardly of the axis of the shaft portion 94 of the lever for retaining the plow body 52 in the raised position. In lowering the plow body 52 again to the working position, the handle 92 of the lever 90 is merely returned to the position in Figure 1.

Thus it will be seen that a simple structure is provided which may be quickly and easily operated from the driver's seat on the tractor for lifting and lowering the plow body relatively to the ground, and for retaining the plow body in the lifted position.

It also will be observed that means is provided for adjusting the plow body both laterally and vertically according to the character of the ground being worked and the requirements of the operator doing the work.

An important feature of the plow structure above described is that it may be readily attached to or detached from the tractor, which is facilitated by the construction of the bracket plates 24. The slotting of the openings 30 and 32 in the plates 24 permits the bolts 26 for holding the plates to be merely loosened for attaching or detaching the plates instead of being entirely removed from the frame bars as would otherwise be necessary. The slots are arranged, however, so that the load on the plates does not tend to pull the plates from the bolts or loosen the bolts, but instead, holds the plates in even more intimate contact with the bolts.

While the present invention has been illustrated and described in connection with a plow body, it will, of course, be understood that other ground working tools may be employed in lieu thereof. Other modifications and changes may be made without departing from the spirit of the invention, and it is intended that the invention be limited only by the scope of the appended claims.

We claim:

1. In a farm machine, a tractor chassis comprising connected longitudinal transversely spaced frame bars, a yoke having its arms extending forward from its bight, said arms being hinged to said bars, said bight comprising a horizontal hinge pin, a sleeve embracing and of less length than said hinge pin so as to be shiftable along said pin, means for securing said sleeve in any desired position along said pin, a beam extending rearwardly from said pin comprising a forward member and an implement-carrying rear member, said sleeve having a portion embracing the forward end of said forward member, means for securing said forward member in rotatively adjusted positions in said sleeve, means pivotally connecting said forward and rear members together about a horizontal transverse axis, means for securing said members in any desired vertically angular relation, means connected with said yoke for swinging said yoke up and down to thereby adjust the height of implements carried by said beam, and means for elevating said beam to a position in which the implements are free of the ground, said elevating means including overcenter means for retaining said beam in said position, said elevating means being operable entirely by hand, leaving the feet of the operator free for other duties.

2. In a farm machine, a tractor chassis comprising connected longitudinal transversely spaced frame bars, a yoke having its arms extending forward from its bight, said arms being hinged to said bars, said bight comprising a horizontal hinge pin, a sleeve embracing and of less length than said hinge pin so as to be shiftable along said pin, means for securing said sleeve in any desired position along said pin, a beam extending rearwardly from said pin comprising a forward member and an implement-carrying rear member, said sleeve having a portion embracing the forward end of said forward member, means for securing said forward member in rotatively adjusted positions in said sleeve, means pivotally connecting said forward and rear members together about a horizontal transverse axis, means for securing said members in any desired vertically angular relation, means connected with said yoke for swinging said yoke up and down to thereby adjust the height of implements carried by said beam, and means for elevating said beam to a position in which the implements are free of the ground, said elevating means including overcenter means for retaining said beam in said position.

3. In a farm machine, a tractor chassis comprising connected longitudinal transversely spaced frame bars, a yoke having its arms extending forward from its bight, said arms being hinged to said bars, said bight comprising a horizontal hinge pin, a sleeve embracing and of less length than said hinge pin so as to be shiftable along said pin, means for securing said sleeve in any desired position along said pin, a beam extending rearwardly from said pin comprising a forward member and an implement-carrying rear member, said sleeve having a portion embracing the forward end of said forward member, means for securing said forward member in rotatively adjusted positions in said sleeve, means pivotally connecting said forward and rear members together about a horizontal transverse axis, means for securing said members in any desired vertically angular relation, and means connected with said yoke for swinging said yoke up and down to thereby adjust the height of implements carried by said beam.

WILLIAM L. ZINK.
BYRON T. AASLAND.